United States Patent Office 3,503,947
Patented Mar. 31, 1970

3,503,947
CATALYTIC PRODUCTION OF HIGH MOLECULAR WEIGHT POLYETHYLENE
Yujiro Kosaka, Momoto Obara, Taiji Shibata, and Yoshihiro Fujita, Yamaguchi-ken, Japan, assignors to Toyo Soda Mfg. Co., Ltd., Yamaguchi-ken, Japan
No Drawing. Filed May 27, 1965, Ser. No. 459,441
Claims priority, application Japan, June 15, 1964, 39/34,244
Int. Cl. C08f 1/42, 1/40, 1/56
U.S. Cl. 260—94.9                                   12 Claims

ABSTRACT OF THE DISCLOSURE

In the polymerization of ethylene to polyethylene in the presence of a polymerization catalyst, the improvement in which the catalyst is a catalytic mixture of (a) the product of the reaction of a mercaptide of the formula M—SR wherein M is sodium or potassium and R is alkyl, with titanium tetrachloride, (b) trialkyl aluminum, and (c) titanium tetraalkoxide.

---

This invention relates to the method of polymerizing ethylene to produce high molecular weight polyethylenes, and, in particular, ethylene polymers ranging from high to low density. The invention also relates to novel catalyst compositions for use in carrying out the said method.

It is generally known that so-called high density polyethylene whose molecular structure is linear with very little branching is produced by the low-pressure polymerization of ethylene in which, for example, a combination of trialkylaluminum and titanium tetrachloride, such as Ziegler catalyst and the like, is used.

The polyethylene so obtained is of high density, that is, of high crystallinity, and has, in comparison with low density polyethylene, a greater ordinary mechanical strength, but is generally inferior in environmental stress and crack resistance, besides being extremely poor in clarity.

In order to remedy these defects, copolymerization of ethylene with a small amount of $\alpha$-olefins such as butene-1 and propylene, etc. has been undertaken, but these processes of copolymerization require olefin sources other than ethylene, and, moreover, the technique of copolymerization according to such processes involves in practical application many difficulties as to the copolymerizing method for the two ingredients as well as problems of control in operation.

The present invention, on the other hand, employs ethylene only as raw material, and provides a new method of manufacturing polymers ranging from low to high density, that is, polymers having varying properties which are optionally selectable, and that with good efficiency and under low pressures.

The catalyst employed in the polymerizing process according to the present method is a catalyst system which is prepared by combining the reaction product of a mercaptide of Group I metals of the Periodic system and titanium tetrachloride, with trialkyl aluminum and titanium tetraalkoxide, the alkyls of the trialkyl groups being lower alkyl.

Mercaptides employed in the above catalyst system are represented by the general formula MSR, in which M denotes a metal of Group I of the Periodic system, particularly sodium or potassium, —SR being a mercaptide radical. Though various methods for obtaining these mercaptides are conceivable, they may be obtained with ease and good efficiency by reacting a corresponding mercaptan with metallic sodium or metallic potassium in the presence or absence of an inert solvent such as hexane or benzene. Of the many mercaptans which can be used here, those which are most suitable are generally alkyl or aryl mercaptans, the alkyl or aryl groups of which have from 1 to 12 carbon atoms, for example, methyl mercaptan, ethylmercaptan, propylmercaptan, n-butylmercaptan, i-butylmercaptan, n-pentylmercaptan, 2-ethylhexylmercaptan, phenylmercaptan, lower alkylphenylmercaptan (e.g. methylphenylmercaptan), etc.

The reaction product of the mercaptide MSR and titanium tetrachloride, one of the ingredients in the composition of the catalyst employed in the present invention, is obtained by conducting the reaction of at least one said mercaptide with titanium tetrachloride in the presence or absence of an inert solvent such as heptane, benzene or petroleum ether at a temperature in the range of 0°–150° C. for from several minutes to 5 hours. The reaction product so obtained is a solid of brownish purple color. The mercaptide may be taken in any ratio relative to the titanium tetrachloride for the reaction operation, but inasmuch as changes in the ratio between the two necessarily alters the yields of the polymer as well as its density, the generally preferable ratio is that in which the molar ratio of mercaptide to titanium tetrachloride $MSR/TiCl_4$ is in the range of 0.05 to 4.0. Any other molar ratio outside this range, for example, a molar ratio exceeding 4.0, is not suitable for obtaining polymers having a density controlled at a desirable reaction velocity. The brownish purple solid so obtained may be employed just as it is produced without subjecting it to a separating process for the purpose, but it is preferable to isolate the brownish purple solid before use by centrifugal separation or by filtration in the presence of the foregoing inert solvent, or by washing in the inert solvent.

Titanium alkoxide, another ingredient in the composition of the catalyst, is represented by the general formula of $Ti(OR)_4$, in which R denotes alkyl of from 1 to 8 carbon atoms, for example, methyl, ethyl, n-propyl, i-propyl, n-butyl, n-hexyl, 2-ethylhexyl, etc.

Trialkyl aluminum still another ingredient in the composition of the catalyst, includes trialkyl aluminums whose alkyl groups contain from 2 to 8 carbon atoms in straight or branched chains, such e.g. as triethyl aluminum, tri-i-butyl aluminum, etc.

The ratios of the ingredients in the composition of the catalyst employed according to the present invention may suitably be changed according to any desired density of the polymer, the density of the polymer obtained being changeable largely according to the ratios of the ingredients in the composition of the catalyst. Generally, as the amount of titanium alkoxide used increases in proportion to the amount of titanium in the reaction product of mercaptide and titanium tetrachloride, the lower will be the density of the polymer obtained. Trialkyl aluminum can be used in the ratio in the range of 1.0 to 5.0 (g-mol/atom) relative to the amount of titanium in the reaction product of mercaptide and titanium tetrachloride and titanium alkoxide, but the more preferable range is 1.5 to 3.5.

This catalyst is employed in a polymerization reactor in the presence of an inert solvent, its concentration in use being not so critical. Generally, the preferable concentration range for the reaction product of mercaptide and titanium tetrachloride is 2 to 30 mg.-atom in terms of the amount of titanium contained therein, for titanium alkoxide 0.1 to 30 mg-mol, and for trialkyl aluminum 5 to 100 mg-mol in one liter of the solvent, respectively.

The polymerization of ethylene in the presence of this catalyst is conducted at temperatures of from 0°–150° C. under pressures in the range of atmosphere to 10 kg./cm.² G. Polymerization velocity decreases at both extremities of the above temperature range, and consequently in order to obtain such polymers as are obtainable when the polymerization is conducted at approximately the middle point of the temeperature range, or 50° to 70° C., at the similar polymerization velocity, it becomes necessary to increase the polymerization pressure. It is desirable, therefore, to conduct the polymerization operation in the temperature range of 50° to 70° C. For the ethylene pressure in the reaction operation in the latter temperature range, 0 to 5 kg./cm.² G. is adequate.

The molecular weight of the polyethylenes produced according to the method of the present invention may easily be changed by suitably selecting ratios of the ingredients in the composition of the catalyst, polymerization temperatures, and pressures or chain transfer agents such a hydrogen. Generally, the molecular weight of the polymers is larger when polymerizing temperature is lower, pressure is higher and the chain transfer agent is less.

While the preparation of the catalyst and the polymerization processes are going on care should be taken to conduct all the operations in an inert atmosphere such as nitrogen in order to prevent any active materials such as water and oxygen from entering into the system.

The ethylene polymers so obtained are in the form ranging from hard resin-like substance to one resembling soft rubber, and it is in the case of producing the resin-like polymers that the present invention is most effective. In terms of the density of the polymers produced, to be more specific, the present invention is more effective to produce ethylene polymers with a density in the range of 0.91–0.98. One of the features of this catalyst, furthermore, is that it gives polymers than can be easily purified and decolorized, also during purifying process. It was found that generally the purifying of the polymers is rendered easier the larger the amount of mercaptide employed in conducting the reaction of mercaptide with titanium tetrachloride.

It is conceivable that the reason why such variety of ethylene polymers ranging from high to low density is produced under low pressures by employing the catalyst prepared according to the present invention lies in the formation in the molecules of polymers having branches, chiefly composed of ethyl groups. The fact that the density of the ethylene polymers is largely controlled by molecular structure had always been made clear by A. H. Willborn (J. Polymer Sci. 34, 569–597, 1959), i.e., the molecular structure of high density polyethylenes is of straight chains with very few side or branch chains, and the density decreases with increases in the number of branch chains.

The results of tests made by the infrared ray absorption method on the ethylene polymers produced by employing the catalyst of the present invention show that the absorption by the terminal methyl group (1378 cm.-1.), which is generally used as a yardstick showing branching degrees, and the absorption which is generally considered to be due to ethyl group (780 cm.-1.), are larger as the density of the polymers decreases. From these results it has been made clear that the ethylene polymers obtained by employing the catalyst of this invention have more parts which contain molecular structure having comparatively a larger number of branch chains as their density becomes lower.

To illustrate the novel method of the present invention, sodium alkyl mercaptide is taken for example in the following; but the method can also be applicable to the case of potassium alkyl mercaptide in the same manner. It is not intended that the present invention be in any way restricted by the examples herein given solely by way of illustration of presently-preferred embodiments of the invention.

EXAMPLES 1–5

The purpose of these examples is to show chiefly the effects which are produced on the polymerization when the ratio between mercaptide and titanium tetrachloride is changed in conducting the reaction operation to obtain a reaction product, which is one of the ingredients in the composition of the catalyst.

A fixed amount of n-BuSNa (n-Bu denotes n-butyl group), 250 ml. (milliliters) of n-heptane and a fixed amount of titanium tetrachloride are added to a 500 ml. stainless autoclave equipped with a vertical magnetic agitator, the air in the autoclave having been thoroughly replaced by dry nitrogen gas, and the contents are then agitated for 30 minutes at 50° C. Then, after adding to the contents a fixed amount of tri-isobutyl aluminum and titanium tetrabutoxide, n-heptane is added until the total volume of the contents amounts to 300 ml., and the mixture is further agitated for 10 minutes. Next, the gas within the autoclave is thoroughly replaced by ethylene, and polymerization reaction is conducted for 3.0 hours while agitating the contents at 60° C. under the pressure of 2.0 kg./cm.² G.

In Example 3, however, the polymer in such a state where farther agitation is no longer possible is formed before the 3 hours' polymerization is up.

Feeding of ethylene is continued for 3 hours after the initiation of the reaction, then the pressure within the autoclave is released and the polymer is transferred into isopropanol, then washed. The polymer is further washed in a mixture of methanol and hydrochloric acid, water and methanol in that order, to completely remove a residue effect, then dried at 50° C. under reduced pressure until the polymer reaches a constant weight. In every case the polymer in white powder form is obtained. The results of these comparative tests are shown in Table 1.

TABLE 1

| | Amount of reagents used when catalyst is prepared | | | | Polymer | | |
|---|---|---|---|---|---|---|---|
| | n-BuSNA, mg. mol | TiCl₄, mg. mol | Al(i-Bu)₃, mg. mol | Ti(OBu)₄, mg. mol | Yield, g. | Density, g./cc. | [η] dl./g. |
| Ex. 1 | 0.2 | 3.0 | 18.0 | 3.0 | 65 | 0.934 | 18.4 |
| Ex. 2 | 3.0 | 3.0 | 18.0 | 3.0 | 90 | 0.930 | 14.0 |
| Ex. 3 | 6.0 | 3.0 | 18.0 | 3.0 | 100 | 0.926 | 11.9 |
| Ex. 4 | 9.0 | 3.0 | 18.0 | 3.0 | 55 | 0.924 | 10.7 |
| Ex. 5 | 12.0 | 3.0 | 18.0 | 3.0 | 40 | 0.924 | 10.7 |

NOTES.—Density is the value obtained in accordance with ASTM-D292-60T. [η] shows the intrinsic viscosity obtained by determination in tetralin at 130°C. "mg"=milligram(s); "g"=gram(s); "dl./g."=deciliters per gram.

EXAMPLES 6–9

In the following examples the amount of titanium alkoxide, which is one of the ingredients in the composition of the catalyst, in variously changed ratios is used to show in particular the effects of such changes in the ratios.

The method of the comparative tests used in these examples is the same as in Examples 1–5. n-Heptane is added until the total contents of the 500 ml.-capacity autoclave is increased up to 300 ml. and the polymerization is conducted for 3.0 hours at 60° C. under the pressure of 2.0 kg./cm.² G. The polymer so obtained is treated in the same way as described in Examples 1–5. Table 2 shows the results of these tests.

TABLE 2

| | Amount of reagents used when catalyst is prepared | | | | Polymer | | |
|---|---|---|---|---|---|---|---|
| | n-BuSNA, mg. mol | TiCl$_4$, mg. mol | Al(i-Bu)$_3$, mg. mol | Ti(OBu)$_4$, mg. mol | Yield, g. | Density, g./cc. | [η] dl./g. |
| Ex. 6 | 6.0 | 3.0 | 9.3 | 0.1 | 105 | 0.955 | 14.0 |
| Ex. 7 | 6.0 | 3.0 | 13.5 | 1.5 | 107 | 0.940 | 11.7 |
| Ex. 8 | 6.0 | 3.0 | 18.0 | 3.0 | 100 | 0.926 | 11.9 |
| Ex. 9 | 6.0 | 3.0 | 27.0 | 6.0 | 53 | 0.924 | 9.7 |

NOTE.—n-Bu and Bu denote respectively n-Butyl groups and i-Bu denotes i-Butyl groups.

EXAMPLES 10–16

The following examples show chiefly the results when the brownish-purple reaction product of mercaptide and titanium tetrachloride, one of the ingredients in the composition of the catalyst, is used after it has been separated.

In dry nitrogen atmosphere a fixed amount of mercaptide is measured and put into a flask of 20 ml. volume, and another fixed amount of titanium tetrachloride, which has been diluted in n-heptane to 10% by weight, is added, then after shaking the mixture at 50° C. for 1 hour, it is placed in a centrifuge settler to separate it into supernatant and precipitate parts, then the precipitate portion is obtained by removing the supernatant part.

5 ml. of benzene is added to this precipitate portion, then after shaking it is put into the centrifuge settler again to separate it into supernatant and precipitate parts, and after twice repeating this operation for the removal of the supernatant, there is obtained a brownish purple precipitate, which is then introduced together with n-heptane into an autoclave of 500 ml. interior volume. A fixed amount of trialkyl aluminum and titanium alkoxide is added, and the total contents are increased up to 300 ml. by adding n-heptane, then polymerization of ethylene is conducted in similar manner as in Examples 1–5. The reaction product so obtained is treated in the like manner as described in Examples 1–5, and there is obtained a polymer in white powder form. Table 3 shows the results of these tests.

TABLE 3

| | Amount of reagents used when catalyst is prepared | | | | Conditions | | | Polymer | | |
|---|---|---|---|---|---|---|---|---|---|---|
| | MSR, mg. mol | TiCl$_4$, mg. mol | AlR$_3$, mg. mol | Ti(OR)$_4$, mg. mol | Pressure, kg./cm.$^2$ G | Temp., °C. | Hrs. | Yield, g. | Density, g./cc. | [η] dl./g |
| Ex. 10 | ¹ 6.0 | 3.0 | ³ 18.0 | ⁶ 3.0 | 3.0 | 60 | 2.0 | 106 | 0.935 | 10.0 |
| Ex. 11 | ¹ 6.6 | 3.3 | ³ 10.5 | ⁶ 0.2 | ⁵ 4.0 | 60 | 1.5 | 85 | 0.976 | 2.6 |
| Ex. 12 | ¹ 4.0 | 2.0 | ³ 9.0 | ⁶ 1.0 | ⁵ 2.0 | 60 | 1.5 | 80 | 0.943 | 6.2 |
| Ex. 13 | ² 6.6 | 3.0 | ³ 12.9 | ⁶ 1.5 | 2.0 | 50 | 2.0 | 70 | 0.938 | 12.0 |
| Ex. 14 | ¹ 6.0 | 3.0 | ⁴ 18.0 | ⁶ 3.0 | 2.0 | 50 | 3.0 | 99 | 0.936 | 11.0 |
| Ex. 15 | ¹ 6.0 | 3.0 | ³ 30.0 | ⁶ 7.0 | 2.0 | 50 | 2.5 | 40 | 0.912 | 11.4 |
| Ex. 16 | ¹ 6.0 | 3.0 | ³ 18.0 | ⁷ 3.0 | 2.0 | 50 | 2.5 | 93 | 0.932 | 10.5 |

¹ n-BuSNa.
² PrSNa.
³ Al(i-Bu)$_3$.
⁴ AlEt$_3$.
⁵ In the presence of hydrogen.
⁶ Ti(OBu)$_4$.
⁷ Ti(OEt)$_4$.

NOTE.—n-Bu and Bu respectively denote n-Butyl groups, while i-Bu denotes i-Butyl group; Pr denotes propyl group and Et denotes ethyl group.
"Kg./cm. G" denotes kilograms per square centimeter gauge.

Essentially comparable results are obtained with other titanium alkoxides in the scope of this invention.

Having thus disclosed the invention, what is claimed is:

1. In the polymerization of ethylene to polyethylene in the presence of polymerization catalyst, the improvement according to which the catalyst consists essentially of (a) the product of the reaction of mercaptide of the formula

M—SR wherein M is a metal of Group I of the Periodic system and R is alkyl of 1 to 12 carbon atoms, with titanium tetrachloride, with the molar ratio M—SR/TiCl$_4$ in the range from 0.05 to 4.0, (b) tri(lower)alkyl aluminum, and (c) titanium tetraalkoxide, the alkoxide groups of the latter containing 1 to 8 carbon atoms.

2. The improvement according to claim 1, wherein the Group I metal is sodium.

3. The improvement according to claim 1, wherein the Group I metal is potassium.

4. The improvement according to claim 1, wherein the ratio of trialkyl aluminum (b) to the amount of titanium in (a) and (c) is in the range of 1.0 to 5.0 g.-mol/g. atom.

5. The improvement according to claim 1, wherein the ratio of trialkyl aluminum (b) to the amount of titanium in (a) and (c) is in the range of 1.5 to 3.5.

6. The improvement according to claim 1, wherein the density of the obtained polyethylene is optionally selectable by correspondingly changing the molar ratio of mercaptide to titanium tetrachloride within the recited range.

7. The improvement according to claim 1, in which the alkyl group of the tri(lower)alkyl aluminum component has 2–8 carbon atoms.

8. The improvement according to claim 1 in which the product of the reaction of the mercaptide and the titanium tetrachloride is a solid.

9. A polymerization catalyst for the polymerization conversion of ethylene to polyethylene, said catalyst consisting esesntially of (a) the solid product of the reaction of mercaptide of the formula

M—SR wherein M is a metal of Group I of the Periodic system and R is alkyl of 1 to 12 carbon atoms, with titanium tetrachloride, with the molar ratio M—SR/TiCl$_4$ in the range from 0.05 to 4.0, (b) tri(lower)alkyl aluminum, and (c) titanium tetraalkoxide, the alkoxide groups of the latter containing 1 to 8 carbon atoms.

10. A polymerization catalyst according to claim 9, wherein the Group I metal is sodium.

11. A polymerization catalyst according to claim 9, wherein the Group I metal is potassium.

12. A polymerization catalyst according to claim 9, wherein the ratio of trialkyl aluminum (b) to the amount of titanium in (a) and (c) is in the range of 1.0 to 5.0 g.-mol/g.-atom.

References Cited

UNITED STATES PATENTS 2,996,459  8/1961  Andersen et al. _____ 260—94.9
3,226,336  12/1965  Schrage et al. _____ 260—93.7
3,357,967  12/1967  Wesslau _____ 260—94.9

JAMES A. SEIDLECKA, Primary Examiner

EDWARD J. SMITH, Assistant Examiner

U.S. Cl. X.R.

252—429